(12) United States Patent  
Gollin et al.

(10) Patent No.: US 8,905,361 B2  
(45) Date of Patent: Dec. 9, 2014

(54) CABLE ROUTING CLIP

(75) Inventors: Andrew Gollin, Bristol (GB); Jack Blanchard, Bristol (GB)

(73) Assignee: Airbus Operations Limited, Bristol (GB)

( * ) Notice: Subject to any disclaimer, the term of this patent is extended or adjusted under 35 U.S.C. 154(b) by 1444 days.

(21) Appl. No.: 12/522,969

(22) PCT Filed: Jan. 14, 2008

(86) PCT No.: PCT/GB2008/050025
§ 371 (c)(1),
(2), (4) Date: Jul. 13, 2009

(87) PCT Pub. No.: WO2008/090371
PCT Pub. Date: Jul. 31, 2008

(65) Prior Publication Data
US 2010/0012792 A1  Jan. 21, 2010

(30) Foreign Application Priority Data
Jan. 22, 2007 (GB) .................. 0701223.0

(51) Int. Cl.
*F16L 3/08* (2006.01)
*F16L 3/12* (2006.01)
*H02G 3/30* (2006.01)

(52) U.S. Cl.
CPC ....................... *H02G 3/30* (2013.01)
USPC ........... 248/74.3; 248/74.1; 248/74.2; 248/73

(58) Field of Classification Search
USPC ............ 248/74.1, 74.2, 74.4, 74.3, 73, 228.6, 248/228.7, 228.8, 230.6, 230.7, 230.8, 248/230.4, 231.71, 231.81, 316.5, 316.7; 24/16 PB See application file for complete search history.

(56) References Cited

U.S. PATENT DOCUMENTS

| | | | |
|---|---|---|---|
| 3,637,177 A * | 1/1972 | Santucci | 248/74.3 |
| 3,861,631 A | 1/1975 | Shorin | |
| 4,714,229 A | 12/1987 | Force et al. | |
| 5,042,773 A * | 8/1991 | Johansen | 248/541 |
| 5,401,905 A | 3/1995 | Lesser et al. | |

(Continued)

FOREIGN PATENT DOCUMENTS

| | | |
|---|---|---|
| EP | 0555687 A1 | 8/1993 |
| GB | 2221009 A | 1/1990 |
| GB | 2337095 A | 11/1999 |
| JP | 4723696 | 11/1972 |

(Continued)

OTHER PUBLICATIONS

UK Search Report for GB0701223.0 dated May 10, 2007.

(Continued)

*Primary Examiner* — Terrell McKinnon  
*Assistant Examiner* — Michael McDuffie  
(74) *Attorney, Agent, or Firm* — Lowe Hauptman & Ham, LLP

(57) ABSTRACT

A cable routing clip comprises a base for attaching the clip to a structure. At least one cable clamp extends from the base. The, or each, cable clamp comprises a ring of resilient material having a split to enable a cable to be inserted therein. A plurality of fastening means are provided for closing the split or splits to retain a cable therein. Each of the plurality of fastening means is arranged to independently retain a cable in the event of the failure of another of the fastening means.

13 Claims, 3 Drawing Sheets

(56) References Cited

U.S. PATENT DOCUMENTS

| | | | |
|---|---|---|---|
| 5,639,049 A | 6/1997 | Jennings et al. | |
| 5,669,591 A | 9/1997 | Perez | |
| 6,220,554 B1* | 4/2001 | Daoud | 248/74.1 |
| 6,513,767 B1* | 2/2003 | Rodgers | 248/74.2 |
| 6,666,415 B2* | 12/2003 | Hansen | 248/74.3 |
| 6,729,588 B2* | 5/2004 | Wilkinson, III | 248/74.1 |
| 7,467,767 B2* | 12/2008 | Miles et al. | 248/74.1 |
| 7,578,486 B1* | 8/2009 | Taylor | 248/75 |
| 2003/0066366 A1 | 4/2003 | Buck et al. | |
| 2003/0164430 A1* | 9/2003 | Walraven | 248/74.1 |
| 2005/0061925 A1* | 3/2005 | Kirschner | 248/49 |
| 2005/0188509 A1* | 9/2005 | Sharkey | 24/2 R |
| 2007/0257161 A1* | 11/2007 | Geppert et al. | 248/74.3 |

FOREIGN PATENT DOCUMENTS

| | | |
|---|---|---|
| JP | 5112998 | 1/1976 |
| JP | 57-5581 | 1/1982 |
| JP | 0338479 | 4/1991 |
| JP | 10094148 | 10/1998 |
| WO | 9320374 A1 | 3/1992 |

OTHER PUBLICATIONS

ISR and Written Opinion for PCT/GB2008/050025 dated Apr. 17, 2008.
Japanese Office Action for Application No. 2009-546002 mailed Oct. 2, 2012.
Japanese Office Action for Application No. 2009-546002 mailed Mar. 19, 2013.

\* cited by examiner

CABLE ROUTING CLIP

The present application is based on International Application Number PCT/GB08/050025 filed Jan. 14, 2008, and claims priority from British Application Number 0701223.0 filed Jan. 22, 2007, the disclosures of which are hereby incorporated by reference herein in their entirety.

FIELD OF THE INVENTION

The present invention relates to a cable routing clip, and to a method of securing a cable to an aircraft structure employing such a clip. In particular, the invention relates to a cable routing clip for use in an aircraft.

BACKGROUND OF THE INVENTION

A known type of cable routing clip, which may be used in aircraft, is a so-called "P-Clip". A P-Clip consists of a ring-shaped cable clamp, arranged to substantially surround a cable, and a tab, for receiving a fastener to attach the clip to a structure. The tab generally extends in a tangential direction relative to the ring-shaped clamp and, therefore, the clip has a cross-sectional shape that resembles the letter P. Two common forms of P-Clip are shown in FIGS. 1 and 2.

In the P-Clip of FIG. 1, the ring-shaped clamp 1 has a split 2 adjacent to the tab 4. The clamp 1 is attached to the tab 4 at one end and is provided with a closure tab 3 at its free end. A cable may be inserted into the clamp 1 through the split 2. A fastener 5 is then provided extending through aligned holes in the tabs 3, 4 to secure the clip to a structure and retain a cable therein.

In the alternate P-Clip of FIG. 2, the ring shaped clamp 1' has a split 2' which is positioned away from the tab 4'. In this arrangement, the clamp 1' is formed of two arcuate members, each provided with a fastening tab 3' at their free ends. The P-Clip of FIG. 2 may be secured to a structure using a fastener 5' passing through the tab 4'. A cable may be inserted into the clamp 1' via the split 2' and the fastening tabs 3' at free ends of the clamp are then connected to secure the cable.

When securing cabling within an aircraft structure it may be necessary to comply with certain safety requirements. For example, in certain regions of an airframe it may be a requirement that the failure of a cable routing clip does not result in the cable falling into a particular region of the structure. One such requirement is that a single failure does not allow the cable to touch the structure in a fuel vapour zone. A fuel vapour zone is defined as an environment in which flammable mixtures can be expected to occur as a result of a fault causing spillage or leakage and where an explosive atmosphere may be present. Examples of regions where this condition may apply could include fuel tanks, wingtips and fuel pipe interfaces. It is, therefore, necessary to ensure that the number and spacing of the cable routing clips provided in particular regions of the airframe are sufficient to meet the safety requirements.

SUMMARY OF THE INVENTION

According to a first aspect of the invention, there is provided a cable routing clip comprising a base for attaching the clip to a structure; at least one cable clamp extending from the base, the or each cable clamp comprising a ring of resilient material, the ring having a split to enable a cable to be inserted therein; and a plurality of fastening means for closing the split or splits to retain a cable within the at least one cable clamp; wherein each of the plurality of fastening means is arranged to independently retain a cable in the event of the failure of another of the fastening means. The cable routing clip may be an aircraft cable routing clip, in other words it may be specifically adapted to be for use in an aircraft.

In some embodiments the base may be adapted to receive a plurality of fasteners, such that a cable may still be retained in position in the event of the failure of a single fastener.

According to another aspect of the invention, there is provided a method of securing a cable within an aircraft structure, the method comprising securing a cable to the structure of the aircraft using at least one cable routing clip in accordance with an embodiment of the invention.

In some embodiments the method may comprise providing a plurality of cable routing clips in accordance with an embodiment of the invention in at least one region of the aircraft structure where failure of a single cable routing clip may be safety critical.

According to a further aspect of the invention there is provided an aircraft cable routing system comprising a cable routing clip in accordance with an embodiment of the invention and a plurality of fasteners for securing the clip to an aircraft structure.

DETAILED DESCRIPTION OF EMBODIMENT(S)

Embodiments of the invention will now be described, by way of example only and with reference to the accompanying drawings, in which.

Figure 4:
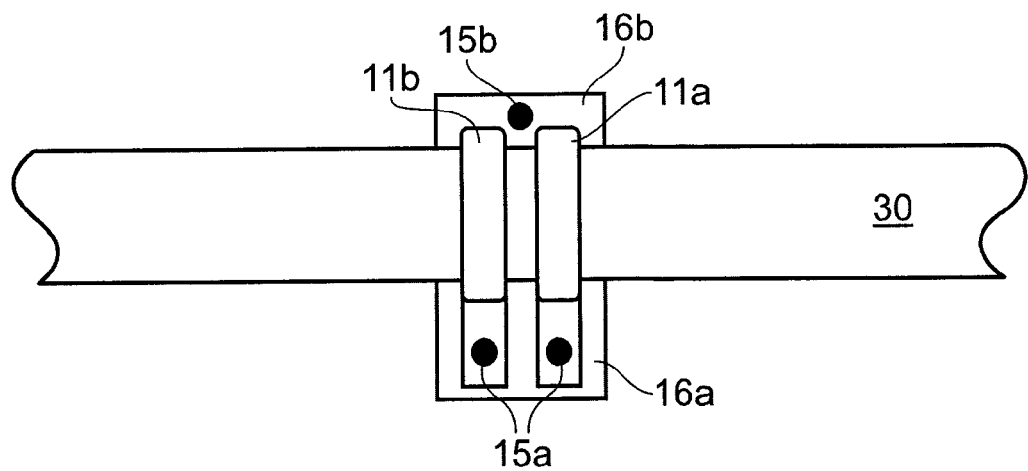
Figure 5:
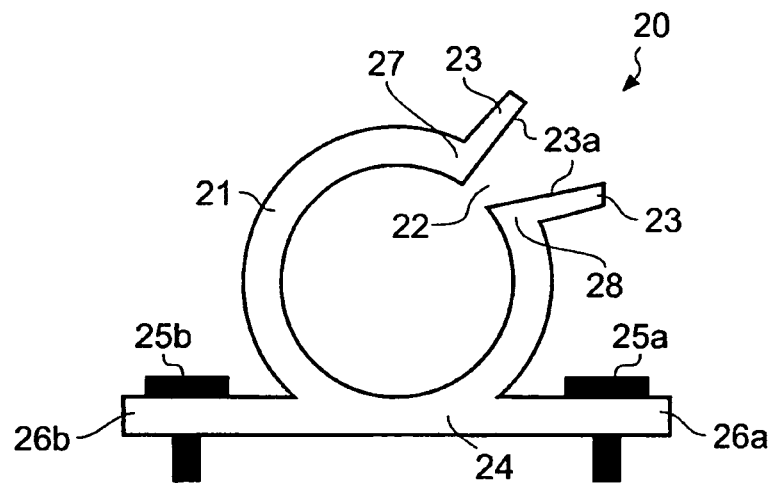
Figure 6:
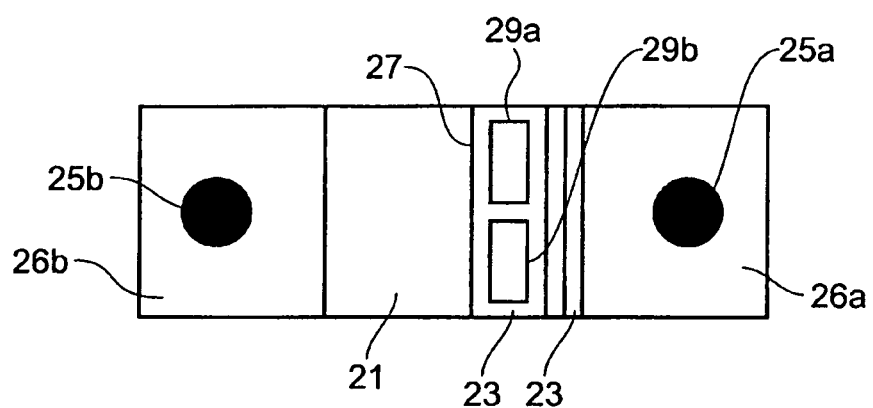

FIG. 4 schematically illustrates the arrangement of a cable and cable routing clip according to an embodiment;

FIG. 5 is a side view of a cable routing clip according to another embodiment; and FIG. 6 is a plan view of the cable routing clip of FIG. 5.

Figure 3:
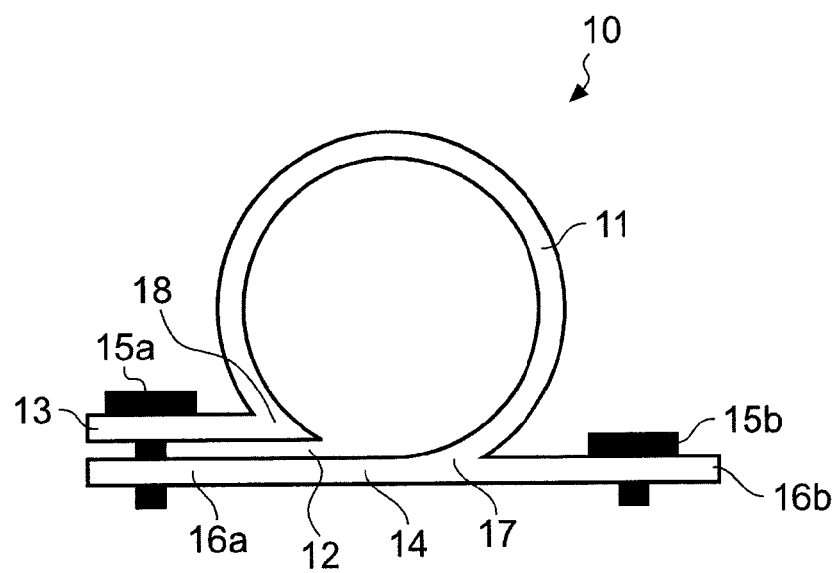
FIG. 3 is a side view of a cable routing clip according to an embodiment.

A first cable routing clip 10 according to an embodiment of the invention is shown in FIG. 3. The cable routing clip 10 comprises a base 14 supporting a cable clamp 11.

The base 14 is a substantially planar rectangular member. Fasteners 15a, 15b secure the base to a structural member. The base 14 is provided with holes for receiving the fasteners 15a, 15b. The base is provided with a pair of tabs 16a, 16b which extend either side of the cable being clamped. The cross-sectional profile of the clip may, therefore, be described as being substantially in the form of the Greek letter omega (Ω), in contrast to the substantially P-shaped cross section of prior art clips. Providing the holes for receiving fasteners 15a, 15b on the tabs 16a, 16b enables the fasteners 15a, 15b to be spaced from the cable clamp 11 so that the cable clamp and/or the cable do not obstruct access to the fasteners 15a, 15b during installation or removal of the clip 10 (as shown most clearly in FIG. 4).

Figure 1:
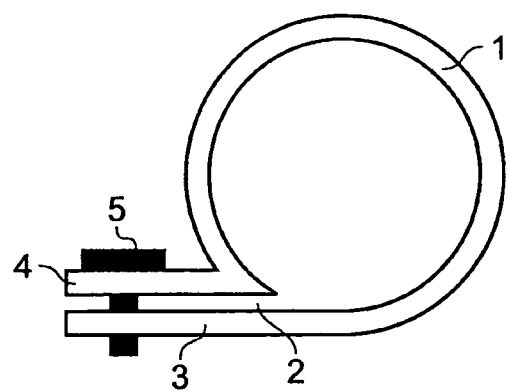
FIG. 1 is a side view of a prior art cable routing clip.
Figure 2:
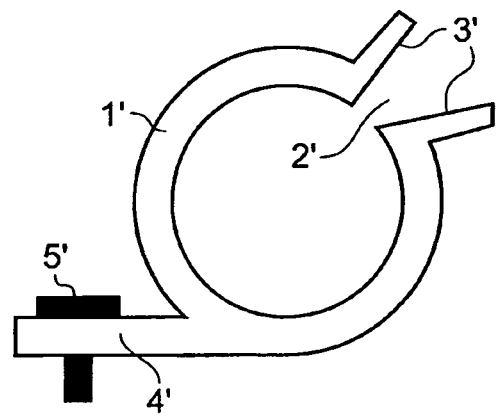
FIG. 2 is a side view of an alternative prior art cable routing clip.

The cable clamp 11 extends from the base 14 in a plane which is generally perpendicular to the plane of the base. The cable clamp is generally similar to known forms of P-Clip as shown in FIGS. 1 and 2 but, as described below, the base is provided with a pair of cable clamps 11a, 11b. Each cable clamp 11 is formed as a generally circular ring of resilient material. The ring is provided with a split 12 adjacent to the base to allow a cable to be inserted into the cable clamp 11. Accordingly, the resilient ring of the cable clamp 11 extends from a fixed end 17 attached to the base to a free end 18 proximal to the base. The free end 18 of the cable clamp 11 is provided with fastening means for closing the split 12 in the cable clamp 11. In the embodiment shown in FIG. 3, the fastening means is a closing tab 13 arranged to be adjacent to one of the base tabs 16*a* and is provided with a hole for receiving a fastener 15*a*.

In use, each cable clamp 11 is deformed against the resistance of the resilient material to enable a cable to be inserted through the split 12. To ease the entry of the cable into the cable clamp 11 the ends 17,18 of the cable clamp may be biased slightly apart, but in order to help retain the cable the spacing may be chosen to be less than the typical diameter of the cable (for example less than 5 mm). When the cable has cleared the ends 17, 18 the cable clamp 11 springs back into its non-deformed position to close the split and substantially surround the cable. Once the cable clamp 11 has sprung back into position, the closing tab 13 lies adjacent to the tab 16*a* on the base 14 of the clip. The holes provided on the base tab 16*a* and the closing tab 13 may then be aligned and a fastener 15*a* inserted through the clip 10 to bring the tabs 16*a*, 13 into abutment (against the bias of the resilient material), thereby both closing the ring to secure the cable within the cable clamp 11 and attaching the clip 10 to the structure.

As shown FIG. 4, the cable routing clip 10 of the invention is provided with both a first cable clamp 11*a* and second cable clamp 11*b*. Both cable clamps 11*a*, 11*b* are formed of a resilient ring of material as described above. Both the first 11*a* and second 11*b* clamps are arranged to clamp the same cable 30 at different points along its length. In other words, the cable routing clip of embodiments of the invention provides a single bracket with a pair of cable clamps. The first 11*a* and second 11*b* cable clamps each extend from the base in substantially parallel planes with the resilient rings being coaxially arranged.

FIG. 5 shows a second embodiment having a different cable clamp arrangement. In contrast to the first embodiment, the cable routing clip 20 is provided with a single cable clamp 21 extending from a base 24. The base 24 is of a similar arrangement to that of the first embodiment and is provided with a pair of tabs 26*a*, 26*b* for receiving fasteners 25*a*, 25*b* either side of the cable clamp.

The cable clamp 21 is formed as a generally circular ring of resilient material. The ring is provided with a split 22 spaced circumferentially away from the base (i.e. near to the top of the ring), such that the cable clamp 21 is formed of two arcuate members. Each member extends from a fixed end attached to the base to a free end 27, 28 distal from the base. The free ends 27, 28 of the cable clamp are each biased apart by a small amount to aid entry of a cable into the cable clamp. The spacing between the ends 27,28 is, however, less than the width of the typical cable to be clamped such that the arcuate members of the clamp 21 must be moved apart, against the resilience of the material, in order to insert a cable. The members will then spring back into place once the cable has cleared the ends 27, 28.

The free ends 27, 28 are provided with fastening means to close the split 22 in the clamp 21 and retain the cable. In the embodiment of FIG. 5, each of the free ends 27, 28 are provided with a projection 23 which extends away from the resilient ring in a generally radial direction and the fastening means are provided on the projection 23.

As seen most clearly in FIG. 6, the fastening means in this embodiment, in fact, comprises a pair of fastening means. More specifically the fastening means is provided in the form of two slots 29*a*, 29*b* in a first one of the projections 23. The opposing projection 23 is also provided with two corresponding slots (not shown). Thus, the ring may be closed using two cable ties; a first cable tie extending through slot 29*a* and the corresponding slot on the opposing projection and a second cable tie extending through the second slot 29*b* and the corresponding slot on the opposing projection.

When the arcuate members of the cable clamp 21 are in an undeformed position (as shown in FIG. 5), the projections 23 are angled away from one another at an acute angle and their opposed faces 23*a* define a V-shaped mouth leading into the split 22, this mouth may assist insertion of a cable into the clamp 21. Once a cable has been inserted the projections 23 may be brought together, against the bias of the resilient material, and fastened together with a cable tie in each slot 29*a*, 29*b* to retain the cable. In the deflected (closed) position the opposed faces 23*a* of the projections 23 are in abutment with one another and are generally co-planar.

The skilled person will appreciate that the cable clip according to either embodiment may be formed from any convenient material and that the material may be selected dependent upon the temperature range in which the clip is to operate. The clip may for example be formed of a material having an operating temperature range of at least −55° C. to +150° C. or the clip may be formed of a material having an operating temperature range of at least −55° C. to +260° C. The clip may be formed of a metal body with an elastomer coating. Suitable materials for the coating include, for example, Silicone, Fluorosilicone or Ethylene Propolene. The metal body of the clip may be formed of AG5 (aluminium 5056) for operating temperatures between −55° C. to +80° C. or CRES (Corrosion Resistant Steel) for higher operating temperatures.

When using a clip according to either embodiment of the invention a single failure, for example a failure of one of the fastening means or one of the fasteners, should not result in the clip releasing the cable. In other words, a cable clip according to embodiments of the invention provides redundancy in the fastening means. Since both of specific embodiments above are provided with two fastening means, the embodiments described above provide a double redundant fastening means.

Advantageously, the number of the cable routing clips required in any particular region (in order to meet the safety requirements) may be reduced when using a clip according to embodiments of the invention in comparison to a conventional P-Clip. For example less clips may be required and/or a greater spacing may be provided between adjacent clips while still meeting the requirements in the event of a single failure. It will be appreciated that when clips are used in an aircraft a reduction in the number of clips will, advantageously, reduce weight.

Accordingly, embodiments of the invention may be used in a method of securing a cable within an aircraft structure. The method may comprise identifying regions of an aircraft in which the occurrence of a single failure on a cable routing clip could be safety critical and securing any cable in such regions using a cable routing clip according to an embodiment of the invention in that region. For example the region may be close to a fuel vapour region. A single failure may, for example, be considered safety critical if it could simultaneously affect 1M/1S or 2M/2S (Where M is a mechanical route and S is a sensitive route; and where 1 and 2 are two independent systems run substantially in parallel so as to ensure that a failure of a single route does not disable any part of the system) and could generate a surface runaway.

In some embodiments the method may comprise providing a plurality of cable routing clips in accordance with an embodiment of the invention in at least one region of the aircraft structure where failure of a single cable routing clip may be safety critical.

While the present invention has been illustrated by the description of the embodiments thereof, and while the embodiments have been described in considerable detail, it is not the intention of the applicant to restrict or in any way limit the scope of the appended claims to such detail. Additional advantages and modifications will be apparent to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

For example, it will be appreciated by the skilled person that cable routing clips may be used to clamp either single cables or bundles of cables. Accordingly, any references herein to a cable are not considered limiting, and may include a bundle of cables.

The skilled person will also appreciate that the fastening means for securing the cable within the cable clip may take any convenient form and is not limited to the arrangements disclosed above. For example, the fastening means may comprise interlocking members provided on free ends of the cable clamp. One example of such interlocking members is the ratchet mechanism used on a conventional cable-tie: that is, a first male member carries a series of saw-tooth serrations which engage with a spring arm in a hole of a second female member which allows the male member to be threaded through the hole of the female member, but prevents it moving back.

It will be understood that features described with reference to the first cable routing clip according to an embodiment of the invention are equally applicable to the second cable routing clip according to an embodiment of the invention and vice versa. For example, in some embodiments a cable routing clip of the type having a split at the base may be provided with a single cable clamp and two fastening means. In other embodiments a cable routing clip having a pair of cable clamps, each having a single fastening means, may be of the type having a split spaced away from the base and a pair of arcuate members. It will also be appreciated that some embodiments may combine different features of each embodiment.

While the embodiments described are provided with either one or two discrete cable clamps in the form of resilient rings, the skilled person will appreciate that other clamp arrangements will be within the scope of the invention provided that the clip comprises more than one fastening means to ensure that a single failure does not free the cable. For example, in some embodiments a single cable clamp could be provided with at least a portion which comprises a plurality of coaxial arcuate members. In other words, a pair of spaced apart cable clamps could be provided with at least one circumferential portion which is connected.

The invention claimed is:

1. A cable routing clip, comprising:
a base for attaching the clip to a structure;
at least one cable clamp extending from the base, the cable clamp comprising a ring of resilient material, the ring having a split to enable a cable to be inserted therein;
a pair of tabs extending from the base;
wherein each tab receives a fastener on either side of the cable clamp;
a plurality of fastening means for closing the split or splits to retain a cable within the at least one cable clamp;
wherein each of the plurality of fastening means comprises a cable tie and is arranged to independently retain a cable in the event of the failure of another of the fastening means,
wherein the resilient ring comprises two arcuate members, each member extending from a fixed end attached to the base to a free end distal from the base; and,
wherein each of the free ends has a projection extending away from the resilient ring in a generally radial direction, at least a pair of slots is disposed on each projection, and wherein each slot independently receives one of the cable ties.

2. A clip as claimed in claim 1, wherein the base is adapted to receive a plurality of fasteners.

3. A clip as claimed in claim 1, wherein the at least one cable clamp comprises a single cable clamp and the plurality of fastening means comprises at least two fastening means.

4. A clip as claimed in claim 1, wherein the fastening means comprises interlocking members provided on the ends of the respective free ends.

5. A clip as claimed in claim 1, wherein the arcuate members resiliently bias the free ends of the rings apart, and the fastening means is arranged to hold the ends together against the bias of the arcuate members.

6. A clip as claimed in claim 1, formed of a material having an operating temperature range of at least −55° C. to +150° C.

7. A clip as claimed in claim 1, formed of a material having an operating temperature range of at least −55° C. to +260° C.

8. A method of securing a cable within an aircraft structure, the method comprising securing a cable to the structure of the aircraft using at least one cable routing clip as claimed in claim 1.

9. An aircraft cable routing system comprising a cable routing clip as claimed in claim 1, and a plurality of fasteners for securing the clip to an aircraft structure.

10. An aircraft including a cable routing clip, comprising:
a base for attaching the clip to a structure;
at least one cable clamp extending from the base, the or each cable clamp comprising a ring of resilient material, the ring having a split to enable a cable to be inserted therein;
a pair of tabs extending from the base;
wherein each tab receives a fastener on either side of the cable clamp;
a plurality of fastening means for closing the split or splits to retain a cable within the at least one cable clamp;
wherein each of the plurality of fastening means comprises a cable tie and is arranged to independently retain a cable in the event of the failure of another of the fastening means,
wherein the or each resilient ring comprises two arcuate members, each member extending from a fixed end attached to the base to a free end distal from the base; and,
wherein each of the free ends has a projection extending away from the resilient ring in a generally radial direction, at least a pair of slots is disposed on each projection, and wherein each slot independently receives one of the cable ties.

11. A cable routing clip comprising
a base for attaching the clip to a structure;
at least one cable clamp extending from the base, the or each cable clamp comprising a ring of resilient material, the ring having a split to enable a cable to be inserted therein; and
a plurality of fastening means for closing the split or splits to retain a cable within the at least one cable clamp;
wherein each of the plurality of fastening means is arranged to independently retain a cable in the event of the failure of another of the fastening means, wherein the at least one cable clamp comprises two cable clamps and the plurality of fastening means comprises a single fastening means on each cable clamp;

wherein the base comprises first and second base tabs, which extend either side of the two cable clamps, for receiving fasteners;

wherein each resilient ring extends from a fixed end attached to the base to a free end proximal to the base and wherein the free end is provided with at least one fastening means in the form of a closure tab, the closure tab being adjacent to the first base tab such that holes in the closure tab and the adjacent first base tab may be aligned to receive at least one fastener to close the ring and attach the clip to a structure; and wherein the second base tab comprises a hole for receiving a fastener.

12. A clip as claimed in claim 11, wherein the cable clamps are arranged on the base such that, in use, a cable is secured to a structure by being routed through both cable clamps.

13. A clip as claimed in claim 11, wherein the rings of the cable clamps are substantially coaxial.

* * * * *